(12) United States Patent
Evans et al.

(10) Patent No.: US 6,714,014 B2
(45) Date of Patent: Mar. 30, 2004

(54) APPARATUS AND METHOD FOR WELLBORE RESISTIVITY IMAGING USING CAPACITIVE COUPLING

(75) Inventors: Martin Townley Evans, Norwich (GB); Andrew Richard Burt, Lowestoft (GB); Albert Alexy, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/836,980

(22) Filed: Apr. 18, 2001

(65) Prior Publication Data
US 2002/0153897 A1 Oct. 24, 2002

(51) Int. Cl.[7] ................................................ G01V 3/20
(52) U.S. Cl. ........................................ 324/374; 324/355
(58) Field of Search ................................ 324/374, 373, 324/375, 367, 355

(56) References Cited

U.S. PATENT DOCUMENTS

| | | | |
|---|---|---|---|
| 3,365,658 A | 1/1968 | Birdwell | 324/10 |
| 3,953,796 A | 4/1976 | Keller | 324/158 R |
| 3,973,181 A | * 8/1976 | Calvert | 324/355 |
| 4,122,387 A | 10/1978 | Ajam et al. | 324/10 |
| 4,468,623 A | 8/1984 | Gianzero et al. | 324/367 |
| 4,471,307 A | * 9/1984 | Bravenec | 324/323 |
| 5,502,686 A | 3/1996 | Dory et al. | 367/34 |
| 6,173,793 B1 | 1/2001 | Thompson et al. | 175/45 |

* cited by examiner

Primary Examiner—Walter E. Snow
(74) Attorney, Agent, or Firm—Madan, Mossman & Sriram, P.C.

(57) ABSTRACT

An apparatus for obtaining resistivity images of a borehole includes an array of measure electrodes separated from a pad or the body of the instrument by a focusing electrode. The focusing electrode is maintained at a slightly higher potential than the measure electrodes. The apparatus is primarily intended for use with conducting fluids but may also be used with non-conducting fluids. A modulated electrical current with a carrier frequency of 1 MHz is injected into the formation. When used with a non-conducting fluid, capacitive coupling between the electrode and the conductive formation is provided by the dielectric of fluid. When used with a conducting borehole fluid, an additional capacitor may be incorporated into the circuit. The current in the measure electrode is indicative of the conductivity of the formation. To avoid cross-talk between conductors in an isolator section between the current source and the measure electrode, signals indicative of the measure currents are demodulated to a frequency of 1.1 kHz. This makes it possible to use the configuration of prior art devices designed for conductive coupling between the logging tool and the formation.

82 Claims, 4 Drawing Sheets

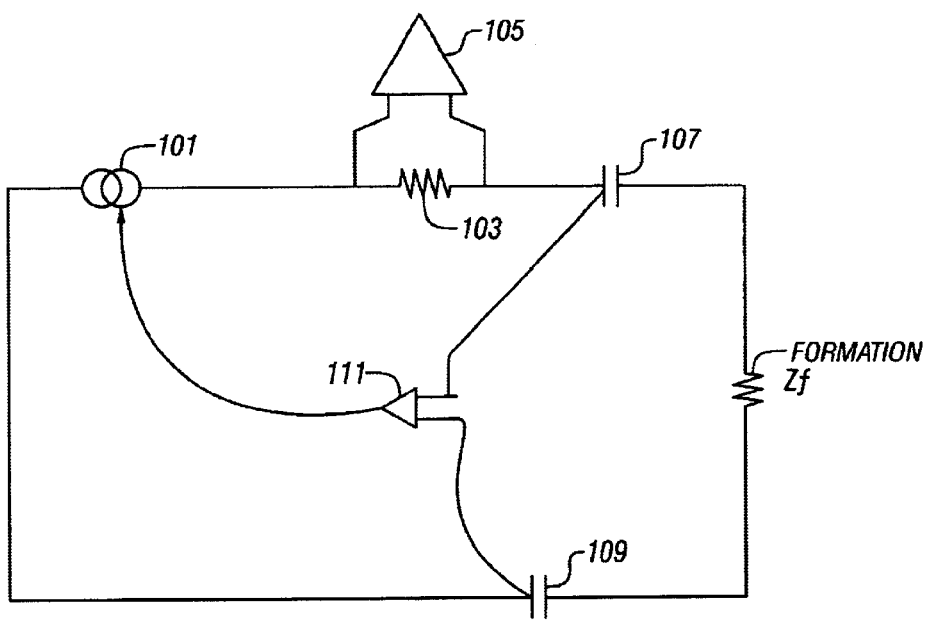
FIG. 3
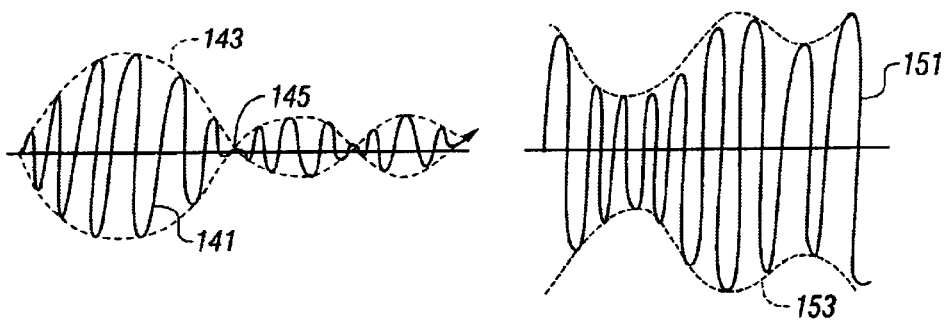
FIG. 4A  FIG. 4B

APPARATUS AND METHOD FOR WELLBORE RESISTIVITY IMAGING USING CAPACITIVE COUPLING

BACKGROUND OF THE INVENTION

1. Field of the Invention

This invention generally relates to explorations for hydrocarbons involving electrical investigations of a borehole penetrating an earth formation. More specifically, this invention relates to highly localized borehole investigations employing the introduction and measuring of individual survey currents injected into the wall of a borehole by capacitive coupling of electrodes on a tool moved along the borehole with the earth formation.

2. Background of the Art

Electrical earth borehole logging is well known and various devices and various techniques have been described for this purpose. Broadly speaking, there are two categories of devices used in electrical logging devices. In the first category, a measure electrode (current source or sink) are used in conjunction with a diffuse return electrode (such as the tool body). A measure current flows in a circuit that connects a current source to the measure electrode, through the earth formation to the return electrode and back to the current source in the tool. In inductive measuring tools, an antenna within the measuring instrument induces a current flow within the earth formation. The magnitude of the induced current is detected using either the same antenna or a separate receiver antenna. The present invention belongs to the first category.

There are several modes of operation: in one, the current at the measuring electrode is maintained constant and a voltage is measured while in the second mode, the voltage of the electrode is fixed and the current flowing from the electrode is measured. Ideally, it is desirable that if the current is varied to maintain constant the voltage measured at a monitor electrode, the current is inversely proportional to the resistivity of the earth formation being investigated. Conversely, it is desirable that if this current is maintained constant, the voltage measured at a monitor electrode is proportional to the resistivity of the earth formation being investigated. Phm's law teaches that if both current and voltage vary, the resistivity of the earth formation is proportional to the ratio of the voltage to the current.

Birdwell (U.S. Pat. No. 3,365,658) teaches the use of a focused electrode for determination of the resistivity of subsurface formations. A survey current is emitted from a central survey electrode into adjacent earth formations. This survey current is focused into a relatively narrow beam of current outwardly from the borehole by use of a focusing current emitted from nearby focusing electrodes located adjacent the survey electrode and on either side thereof. Ajam et al (U.S. Pat. No. 4,122,387) discloses an apparatus wherein simultaneous logs may be made at different lateral distances through a formation from a borehole by guard electrode systems located on a sonde which is lowered into the borehole by a logging cable. A single oscillator controls the frequency of two formation currents flowing through the formation at the desired different lateral depths from the borehole. The armor of the logging cable acts as the current return for one of the guard electrode systems, and a cable electrode in a cable electrode assembly immediately above the logging sonde acts as the current return for the second guard electrode system. Two embodiments are also disclosed for measuring reference voltages between electrodes in the cable electrode assembly and the guard electrode systems Techniques for investigating the earth formation with arrays of measuring electrodes have been proposed. See, for example, the U.S. Pat. No. 2,930,969 to Baker, Canadian Pat. No. 685,727 to Mann et al. U.S. Pat. No. 4,468,623 to Gianzero, and U.S. Pat. No. 5,502,686 to Dory et al. The Baker patent proposed a plurality of electrodes, each of which was formed of buttons which are electrically joined by flexible wires with buttons and wires embedded in the surface of a collapsible tube. The Mann patent proposes an array of small electrode buttons either mounted on a tool or a pad and each of which introduces in sequence a separately measurable survey current for an electrical investigation of the earth formation. The electrode buttons are placed in a horizontal plane with circumferential spacings between electrodes and a device for sequentially exciting and measuring a survey current from the electrodes is described.

The Gianzero patent discloses tool mounted pads, each with a plurality of small measure electrodes from which individually measurable survey currents are injected toward the wall of the borehole. The measure electrodes are arranged in an array in which the measure electrodes are so placed at intervals along at least a circumferential direction (about the borehole axis) as to inject survey currents into the borehole wall segments which overlap with each other to a predetermined extent as the tool is moved along the borehole. The measure electrodes are made small to enable a detailed electrical investigation over a circumferentially contiguous segment of the borehole so as to obtain indications of the stratigraphy of the formation near the borehole wall as well as fractures and their orientations. In one technique, a spatially closed loop array of measure electrodes is provided around a central electrode with the array used to detect the spatial pattern of electrical energy injected by the central electrode. In another embodiment, a linear array of measure electrodes is provided to inject a flow of current into the formation over a circumferentially effectively contiguous segment of the borehole. Discrete portions of the flow of current are separably measurable so as to obtain a plurality of survey signals representative of the current density from the array and from which a detailed electrical picture of a circumferentially continuous segment of the borehole wall can be derived as the tool is moved along the borehole. In another form of an array of measure electrodes, they are arranged in a closed loop, such as a circle, to enable direct measurements of orientations of resistivity of anomalies The Dory patent discloses the use of an acoustic sensor in combination with pad mounted electrodes, the use of the acoustic sensors making it possible to fill in the gaps in the image obtained by using pad mounted electrodes due to the fact that in large diameter boreholes, the pads will necessarily not provide a complete coverage of the borehole.

The prior art devices, being contact devices, are sensitive to the effects of borehole rugosity: the currents flowing from the electrodes depend upon good contact between the electrode and the borehole wall. If the borehole wall is irregular, the contact and the current from the electrodes is irregular, resulting in inaccurate imaging of the borehole. A second drawback is the relatively shallow depth of investigation caused by the use of measure electrodes at the same potential as the pad and the resulting divergence of the measure currents.

Co-pending U.S. patent application Ser. No. 09/754,431 having the same assignee as the present application and the contents of which are incorporated herein by reference, discloses an apparatus that includes an array of measure electrodes separated from a pad or the body of the instrument by focus electrodes, the pad or body acting as the guard electrode. The focus electrode is maintained at a slightly lower potential than the pad and the measure electrode is at an intermediate potential thereto. With this arrangement, the current from the measure electrode initially diverges as it enters the formation, then converges (focuses) and then finally diverges again to define a depth of investigation. This arrangement makes it relatively insensitive to borehole rugosity.

Yet another drawback with the use of contact devices injecting electrical currents into a wellbore arises when oil-based muds are used in drilling. Oil-based muds must be used when drilling through water soluble formations: an increasing number of present day exploration prospects lie beneath salt layers. Besides reducing the electrical contact between the logging tool and the formation, invasion of porous formations by a resistive, oil-based mud greatly reduces the effectiveness of prior art resistivity imaging devices. This problem is not alleviated by the use of focusing electrodes.

It would be desirable to have an apparatus and method of determination of formation resistivity that is relatively insensitive to borehole rugosity and can be used with either water based or with oil-based muds. The present invention satisfies this need.

SUMMARY OF THE INVENTION

The present invention is an apparatus conveyed in a borehole for obtaining a resistivity image of an earth formation penetrated by the borehole. The apparatus includes at least one measure electrode that injects a beam of a measure current into the formation. Due to the high frequency of the current, an electrical circuit is completed when the borehole is filled with a non-conductive fluid through a capacitive gap between the electrode and the formation. Focusing electrodes are used to focus the electrical current and the pad on which the electrode is mounted further serves to focus or guard the current into the formation. In one embodiment of the invention designed for use with a conductive borehole fluid, an additional capacitor is used in the measuring circuit. In a preferred embodiment of the invention, four pads on the tool, each with a plurality of measure electrodes, provide a circumferential image of the formation. The modulation of the measure current and the demodulation of the output of the current measuring circuit helps reduce the cross-talk between them. Amplitude modulation, reverse amplitude modulation, frequency modulation or phase modulation may be used.

In another embodiment of the invention, the at least one measure electrode forms part of an array of electrodes. With such an arrangement, the present invention may be used for forming a resistivity log or image of the borehole wall in the presence of non-conducting borehole fluids.

In another embodiment of the invention, resistivity measurements or resistivity images may be obtained when the borehole fluid is a conducting fluid. Prior art devices have used blocking capacitors as part of the measure circuit to block any extraneous DC currents. On embodiment of the invention makes use of the fact that the capacitance of these blocking capacitors may be selected so that high frequency measure currents may still be injected into the borehole.

The size of the measure electrodes is selected so as to provide an impedance that is less than the expected impedance of the formation at the operating frequencies.

BRIEF DESCRIPTION OF THE FIGURES

FIG. 3 is a schematic circuit diagram showing the principles of operation of the tool.

FIGS. 4a and 4b shows a comparison between a prior art modulated signal and a reverse modulated signal according to the present invention.

DETAILED DESCRIPTION OF THE INVENTION

Figure 1:
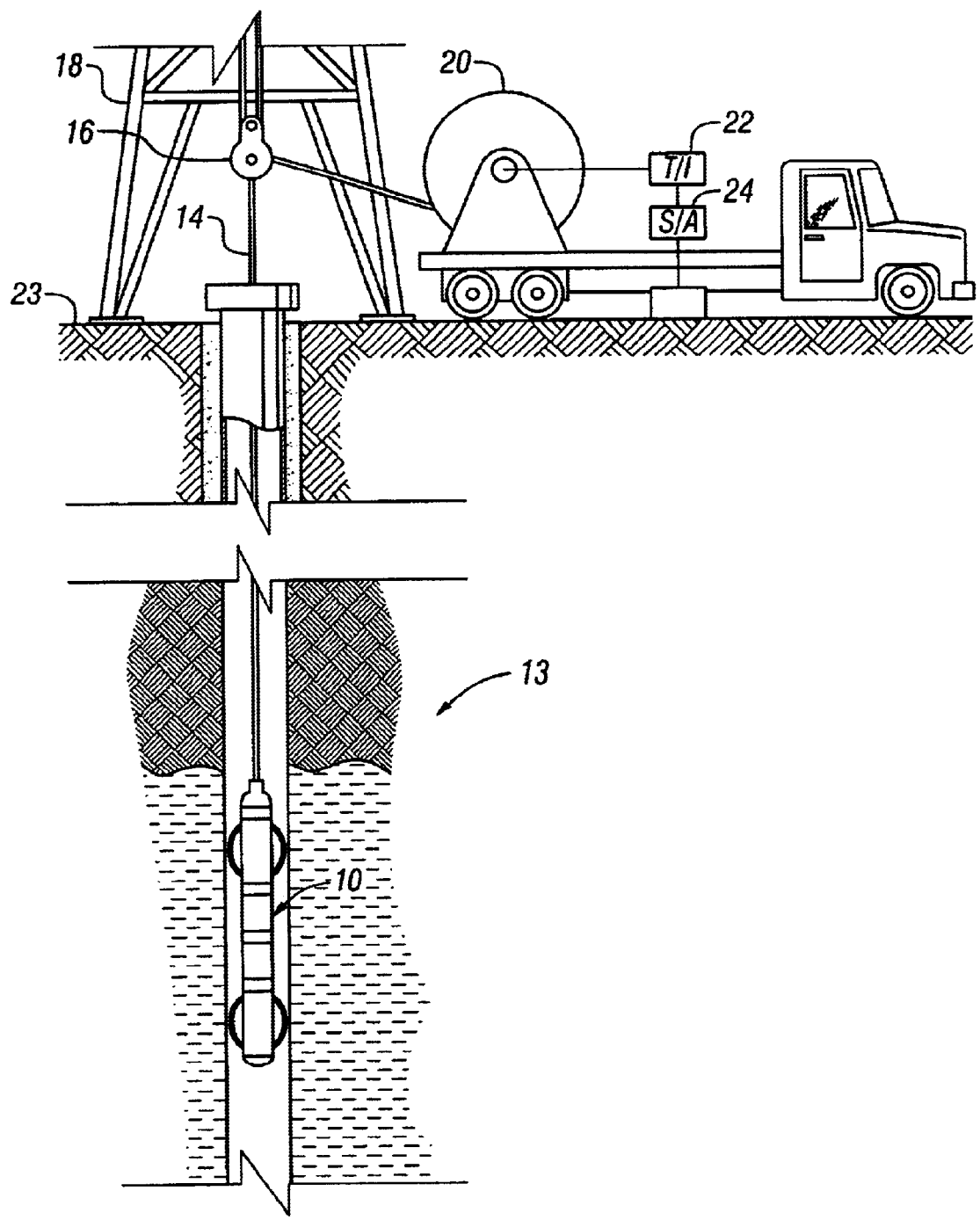
FIG. 1 shows the imaging tool of this invention suspended in a borehole.

In order to gain a proper understanding of the present invention, reference is made to FIGS. 1–5. FIG. 1 shows an imaging tool 10 suspended in a borehole 12, that penetrates earth formations such as 13, from a suitable cable 14 that passes over a sheave 16 mounted on drilling rig 18. By industry standard, the cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer24, may be provided for performing data analysis in the field in real time or the recorded data may be sent to a processing center or both for post processing of the data.

Figure 2A:
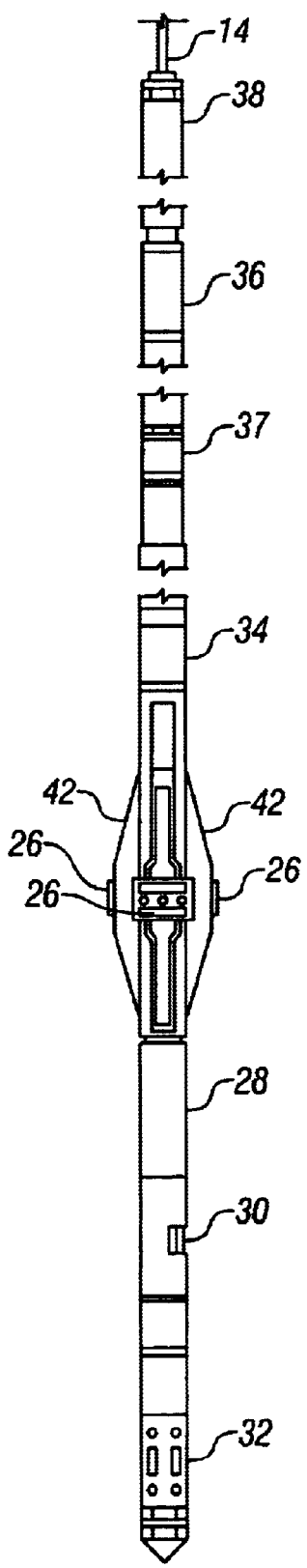
FIG. 2A is a detail view of an electrode pad.
Figure 2B:
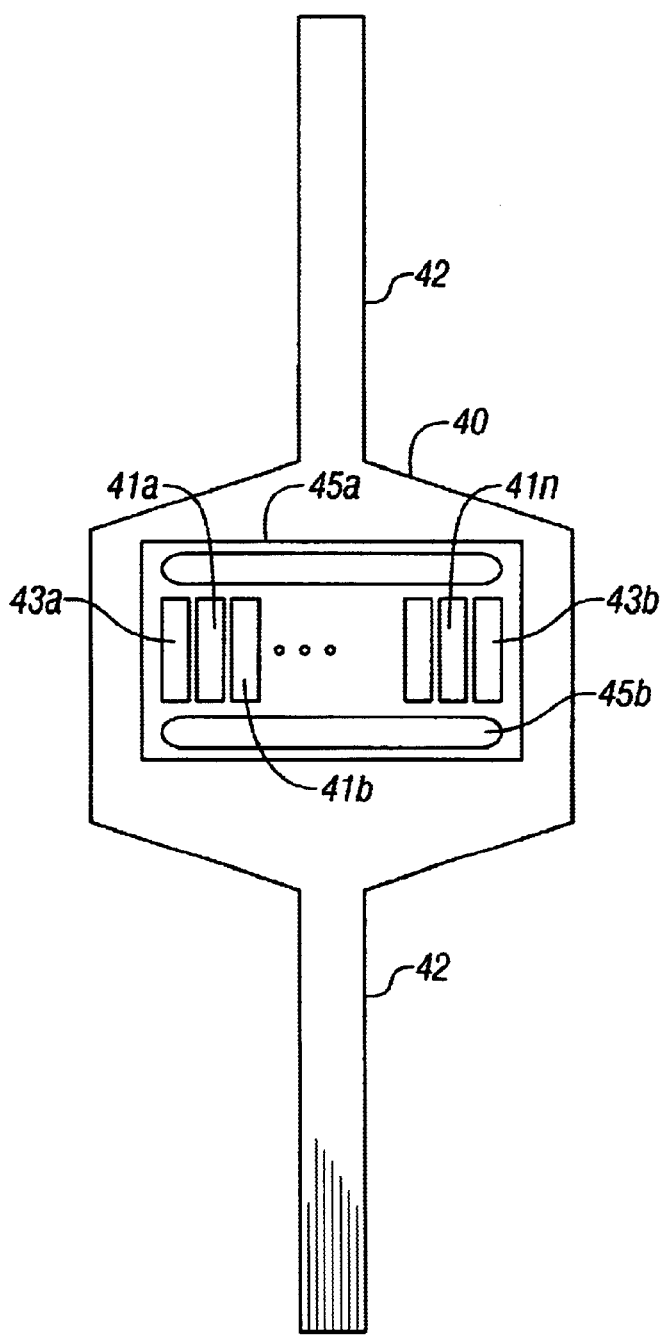
FIG. 2 is a mechanical schematic view of the imaging tool.

FIG. 2 is a schematic external view of a borehole sidewall imager system. The tool 10 comprising the imager system includes resistivity arrays 26 and, optionally, a mud cell 30 and a circumferential acoustic televiewer 32. Electronics modules 28 and 38 may be located at suitable locations in the system and not necessarily in the locations indicated. The components may be mounted on a mandrel 34 in a conventional well-known manner. The outer diameter of the assembly is about 5 inches and about fifteen feet long. An orientation module 36 including a magnetometer and an accelerometer or inertial guidance system may be mounted above the imaging assemblies 26 and 32. The upper portion 38 of the tool 10 contains a telemetry module for sampling, digitizing and transmission of the data samples from the various components uphole to surface electronics 22 in a conventional manner. If acoustic data are acquired, they are preferably digitized, although in an alternate arrangement, the data may be retained in analog form for transmission to the surface where it is later digitized by surface electronics 22.

Also shown in FIG. 2 are three resistivity arrays 26 (a fourth array is hidden in this view. Referring to FIGS. 2 and 2A, each array includes measure electrodes 41a, 41b, . . . 41n for injecting electrical currents into the formation, focusing electrodes 43a, 43b for horizontal focusing of the electrical currents from the measure electrodes and focusing electrodes 45a, 45b for vertical focusing of the electrical currents from the measure electrodes. By convention, "vertical" refers to the direction along the axis of the borehole and "horizontal" refers to a plane perpendicular to the vertical.

In a preferred embodiment of the invention, the measure electrodes are rectangular in shape and oriented with the long dimension of the rectangle parallel to the tool axis. Other electrode configurations are discussed below with reference to FIG. 6. For the purpose of simplifying the illustration, insulation around the measure electrodes and focusing electrodes for electrically isolating them from the body of the tool are not shown.

Other embodiments of the invention may be used in measurement-while-drilling (MWD), logging-while-drilling (LWD) or logging-while-tripping (LWT) operations. The sensor assembly may be used on a substantially non-rotating pad as taught in U.S. Pat. No. 6,173,793 having the sane assignee as the present application and the contents of which are fully incorporated herein by reference. The sensor assembly may also be used on a non-rotating sleeve such as that disclosed in U.S. patent application Ser. No. 09/247,340 (now U.S. Pat. No. 6,247,542) the contents of which are fully incorporated here by reference.

For a 5" diameter assembly, each pad can be no more than about 4.0 inches wide. The pads are secured to extendable arms such as 42. Hydraulic or spring-loaded caliper-arm actuators (not shown) of any well-known type extend the pads and their electrodes against the borehole sidewall for resistivity measurements. In addition, the extendable caliper arms 42 provide the actual measurement of the borehole diameter as is well known in the art. Using time-division multiplexing, the voltage drop and current flow is measured between a common electrode on the tool and the respective electrodes on each array to furnish a measure of the resistivity of the sidewall (or its inverse, conductivity) as a function of azimuth.

Turning now to FIG. 3, a circuit diagram showing the principles of operation of the tool is given. A source of electrical power 101 produces an electrical current that is provided to the measure electrodes. In one embodiment of the invention, the apparatus is intended for use with oil based drilling mud and the capacitor 107 depicts the capacitive coupling between a measure electrode such as 41a in FIG. 2a and the formation 13 in FIG. 1. The electrical current flows through the formation that has an equivalent impedance of $Z_f$ and returns to the current source 101 through an equivalent capacitor 109 representing the coupling between the formation and the diffuse return electrode, typically the body of the tool. The measurement of the voltage drop across a resistor 103 is used as an indication of the current flowing to a measure electrode. Other methods for measurement of the current in the measure electrode may also be used. Such methods would be known to those versed in the art and are not discussed here. In a preferred embodiment of the invention, the value of the resistor 103 is 1 kΩ. The impedance of the rest of the return path in the body of the tool can be ignored.

Still referring to FIG. 3, a voltage detector 111 measures the voltage difference between the measure electrode and the diffuse return electrode and controls the current at the current generator to maintain a constant voltage. In this case, the output of the current measuring circuit serves as a measure signal. Alternatively (not shown), the output of the current measuring circuit 105 is used to maintain a constant current and the output of the voltage detector is used as a measure signal. As still another alternative, both the voltage detected by the voltage detector 111 and the current measured by the current measuring circuit 105 are used as measure signals.

Selection of the size of the measure electrode and the operating frequency is based upon several considerations. One important consideration is that the impedance of the formation must be substantially resistive at the operating frequency so that the currents in the measure electrode are indicative of the formation resistivity and substantially unaffected by its dielectric constant. Based upon typical values of formation dielectric constant such as that disclosed in U.S. Pat. No. 5,811,973 issued to Meyer et al, the operating frequency should be less than 4 MHz. As mentioned above, a preferred embodiment of the present invention uses a measuring current at a frequency of 1 MHz. A second consideration is that the impedance (i.e., resistance) of the formation be greater than the impedance of the rest of the circuit of FIG. 3. Another consideration is the desired resolution of the tool. A reasonable resolution for a useful imaging tool is approximately 3 mm. in the horizontal and vertical directions.

The impedance of the equivalent capacitance 109 and the body of the tool may be ignored at 1 MHz since the equivalent capacitor has an enormous area comparable to the size of the tool. The capacitance of 107 is a function of the dielectric constant of the borehole fluid, the area of the electrode, and the stand-off between the electrode and the borehole wall. Formation resistivities encountered in practice may range between 0.2 Ω-m and 20,000 Ω-m. As noted above and discussed below, the present invention makes use of focusing electrodes so that, in general, the effective dimensions of the formation that are sampled by an electrode are less than the actual physical size of the electrodes. Based upon these considerations, and the requirement that a plurality of electrodes must fit on a single pad, in a preferred embodiment of the invention as shown in FIGS. 2, 2A, the individual measure electrodes 41a, 41b . . . 41n have a width of 8 mm. and a length of between 20–30 mm. This makes it possible to have eight electrodes on a single pad. The corresponding value of the capacitance 107 is then typically between 1 pF and 100 pF. At the lower value, the impedance of the capacitance 107 at 1 MHz is approximately 160 kΩ and at the higher value approximately 1.6 kΩ

The principles of operation of focusing electrodes is discussed in the '431 application and are not discussed here further. In the present device, the focusing electrodes 45a, 45b are of particular importance as they perform a significant amount of focusing. Denoting by V the potential of the measure electrodes 41a, 41b . . . the electrodes 45a, 45b are maintained at a potential of V+δ. The body of the pad is maintained at a voltage V±ε. A typical value of the voltage V is 5 volts while typical value of δ and ε are 500 μV and 100 μV, with ε being less than δ. Since little focusing is needed in the horizontal direction, the side focusing electrodes 43a, 43b are maintained at substantially V volts. Those versed in the art would recognize that the device could also function if all the voltages were reversed, in which case, the voltages mentioned above as typical values would be magnitudes of voltages.

With the potentials of the measure electrodes, the focusing electrodes and the pads as discussed above, the current from the current source 101 in FIG. 3 will be focused down to square blocks approximately 8 mm. on the side. The operating frequency of the present device is typically 1 MHz, compared to an operating frequency of 1.1 kHz for the device of the '431 application.

Those versed in the art would recognize that a considerable amount of cross-talk would normally be generated between the current flowing to the measure electrodes from the electronics module 38 and the measure signal(s) returning from the measure electrodes carrying information about the voltages and/or currents of the electrodes. The measuring electrodes are preferably isolated from the electronics module by an isolator section such as 37 that is preferably between 2'6" and 15' long. Cross-talk between conductors (not shown) over such distances would be quite large at an operating frequency of 1 MHz would overwhelm the measure signal(s) indicative of the formation resistivity.

This problem is addressed in the present invention by modulating the current output of the generator at 1.1 kHz. The result is that the current traveling down conductors in the isolator section and into the formation is a 1 MHz current modulated at 1.1 kHz. A demodulator is provided in the voltage measuring circuit so that the return signal to the electronics module 38 is a 1.1 kHz signal. The source of the measure current and the demodulator are preferably included in the electronics module 38. This makes it possible to use substantially the same hardware configuration as in the device of '431 application, such device having been designed to substantially attenuate the cross-talk.

To further reduce the effects of cross-talk, instead of conventional amplitude modulation of the currents, an inverse modulation is used. Conventional amplitude modulation is given by a current $$i(t)=\cos(\omega_m t) \cos(\omega_c t) \quad (1)$$

where $\omega_m$ is the modulating signal frequency (1.1 kHz) and $\omega_c$ is the carrier frequency (1 MHz) The inverse modulation of the present invention uses a modulation of the form where $\alpha$ is small compared to 1. The result is that the current output of the generator 101 is substantially at 1 MHz with an amplitude close to unity at all times. This makes the cross-talk substantially independent of the magnitude of the measure current. Substantially the same result may be obtained in alternate embodiments of the invention by using frequency or phase modulation of the 1 MHz cater signal.

FIGS. 4a and 4b show a comparison between a prior art modulated signal and a reverse modulated signal according to the present invention. A carrier signal 141 having a carrier frequency has its amplitude modulated by a lower frequency modulating signal 143. As can be seen, the level of amplitude of the modulated signal goes to zero whenever the modulating signal goes to zero at times such as 145. A reverse modulated signal is shown in FIG. 4b with a carrier signal 151 and a modulating signal 153. This modulated signal always has a significant current flowing. The advantage of using such a reverse modulated signal is that the cross talk is substantially unaffected by the level of the modulating signal.

In an alternate embodiment of the invention, the measure signal(s) is sent through an optical fiber. When an optical fiber is used for the purpose, there will not be any cross talk between the current conveyed through the isolator section and the measure signal. Modulation of the current is then not necessary.

In an alternate embodiment of the invention, the principles described above are used when the measure electrodes are not part of an array of electrodes. With a single electrode, measurements indicative of the resistivity of the formation may be obtained. With a plurality of azimuthally distributed electrodes, such output measurements may be processed using prior art methods, such as those used in dipmeters, to obtain information relating to the dip of formations relative to the borehole. When combined with measurements of the borehole orientation and tool face orientation, such relative dip information may be further processed to give estimates of absolute dip of the formations.

Figure 5:
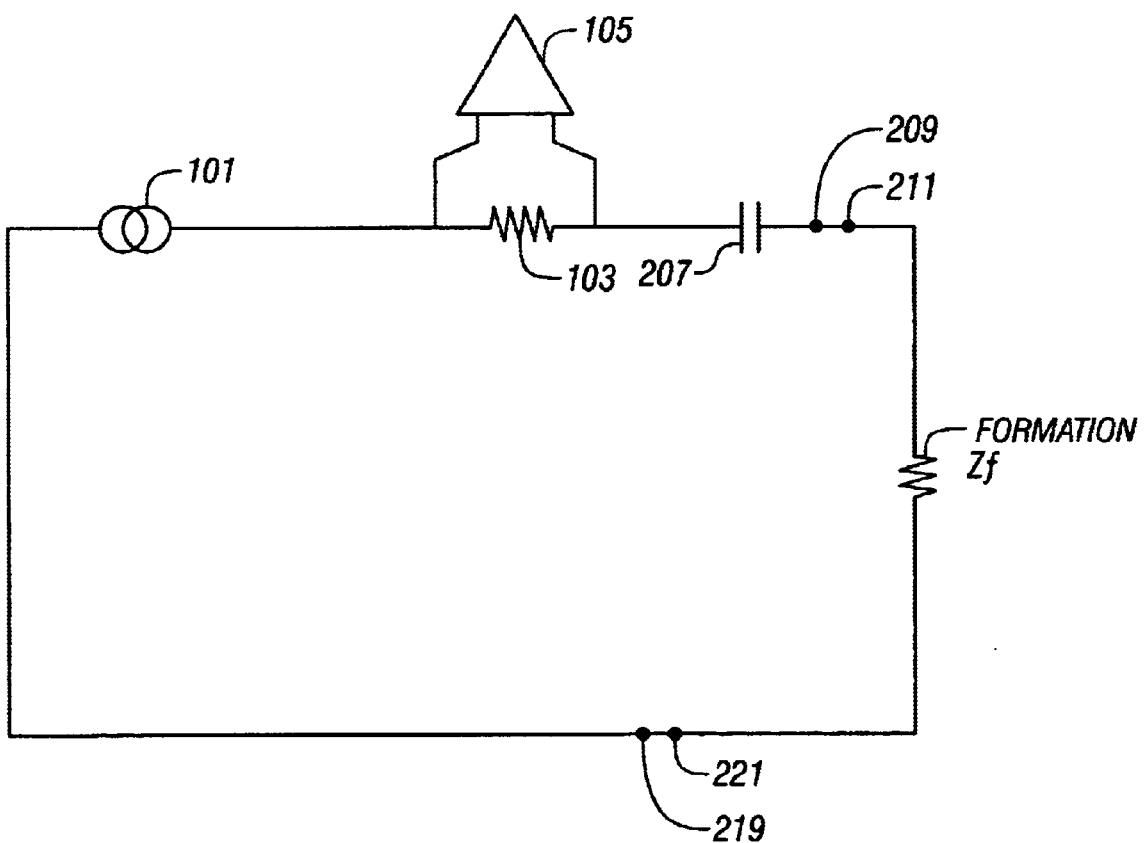
FIG. 5 is a schematic circuit diagram of the tool when used with a conducting borehole fluid.

Another embodiment of the present invention may be used with water based muds. The equivalent circuit for this embodiment is shown in FIG. 5. It is identical to FIG. 3 except that the gap between the measure electrode and the formation is a conductive gap denoted by the points 209–211 and a return gap denoted by 219–221. An additional capacitor 207 may be incorporated into the circuit. The operation of the device is substantially unchanged from that used for non-conducting muds. The conductive paths through the mud shunts any effect of the capacitance of the tool standoff.

Such an arrangement has been used in the past with contact electrodes for resistivity measurements or resistivity imagers. The function of an internal capacitor in such prior art circuits has been solely for the purpose of blocking any extraneous currents emanating from sources external to the measure circuit from entering the amplifiers and distorting the operation of such prior art apparatus. Other methods have also been used for compensating for such extraneous currents. However, the particular embodiment utilizing an external capacitor constructed from instrument electrode plate, conductive earth formation plate and drilling mud dielectric, with high frequency, modulated measure currents such as are used in the present invention and depicted in FIG. 5 have not previously been used.

The resolution of the devices disclosed above is substantially equal to the dimensions of the focused current at a depth where the current from the measure electrode has the smallest dimensions. Those versed in the art would recognize that if lower resolution is acceptable, the focusing electrodes may be eliminated. In such a device, the beam of measure current is only guarded or constrained to flow substantially outward from the surface of the measure electrode, as in prior art non-focused conductive mud devices, by the pad being maintained at substantially the same voltage as the measure electrode.

Figure 6:
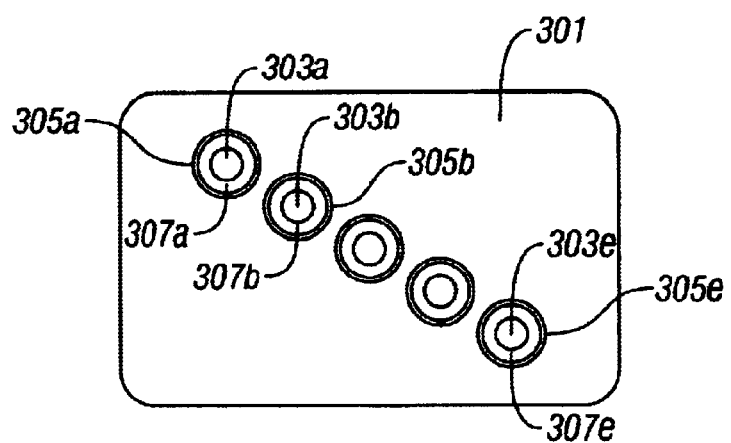
FIG. 6 illustrates an alternate embodiment of an electrode pad.

Alternatively, other configurations of to electrodes on a measuring pad may also be used. FIG. 6 shows an arrangement in which five circular measure electrodes 303a, 303b . . . 303e are located on a pad 301. Each measure electrode is surrounded by an associated focusing electrode 305a, 305b . . . 305e with insulation 307a, 307b . . . 307e therebetween. For simplifying the illustration, the insulation between the guard electrodes and the pad 301 is not shown.

The invention has further been described by reference to logging tools that are intended to be conveyed on a wireline. However, the method of the present invention may also be used with measurement-while-drilling (MWD) tools, or logging while drilling (LWD) tools, either of which may be conveyed on a drillstring or on coiled tubing. In MWD and LWD embodiments as is generally known to those versed in the art, instead of the wireline 14, the logging tool is conveyed on a drilling tubular such as a drillstring or coiled tubing. Such drilling tubulars would be known to those versed in the art and are not discussed further.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. An apparatus conveyed in a borehole for obtaining a resistivity parameter of an earth formation penetrated by the borehole, the apparatus comprising:
    (a) at least one measure electrode at a first electrical potential and in electrical contact with a fluid in the borehole, said at least one measure electrode operatively connected to a source of a modulated electrical current and conveying a measure current into the formation;

(b) at least one focusing electrode at a second potential in proximity to said at least one measure electrode for focusing the measure currents into the formation, said second potential having a magnitude greater than the magnitude of the first potential;

(c) at least one pad carrying said at least one measure electrode and said at least one focusing electrode, said at least one pad at a third electrical potential substantially equal to the first potential for maintaining the focusing of the measure currents in the formation.

2. The apparatus of claim 1 wherein the at least one measure electrode further comprises a plurality of measure electrodes and wherein said resistivity parameter further comprises a resistivity image.

3. The apparatus of claim 2 wherein said plurality of measure electrodes is eight, each of said measure electrodes having a rectangular configuration with a horizontal dimension of 8 mm. and a vertical dimension of between 20 mm. and 30 mm.

4. The apparatus of claim 1 wherein said fluid in the borehole is substantially non-conducting and the at least one measure electrode is capacitively coupled to the formation.

5. The apparatus of claim 1 wherein the modulated electrical current has a carrier frequency and a modulating frequency substantially less than said carrier frequency.

6. The apparatus of claim 5 wherein said carrier frequency is at least 500 kHz. and said modulating frequency is less than 2 kHz.

7. The apparatus of claim 5 wherein said fluid in the borehole is substantially conducting, the apparatus further comprising a capacitor disposed between the at least one measure electrode and the source of electrical current for blocking the component of the measure current at the modulating frequency.

8. The apparatus of claim 1 wherein said at least one focusing electrode further comprises a vertical focusing electrode and a horizontal focusing electrode at a potential substantially equal to the potential of the current electrode.

9. The apparatus of claim 1 wherein said at least one pad further comprises at least four pads circumferentially disposed on the apparatus.

10. The apparatus of claim 1 further comprising a device responsive to least one of (i) the current at the at least one measure electrode, and, (ii) a voltage of the at least one measure electrode, said device producing a measure signal representative of the resistivity parameter.

11. The apparatus of claim 10 further comprising a demodulator for demodulating said measure signal.

12. The apparatus of claim 11 further comprising an isolator section between the current source and the at least one measure electrode, said isolator section including conductors carrying said modulated current to the measure electrode and said demodulated measure signal from the at least one measure electrode.

13. The apparatus of claim 4 wherein a capacitance of a gap between the measure electrode and the formation is between 1 pF and 100 pF.

14. The apparatus of claim 7 wherein said capacitor has a capacitance of between 1 pF and 100 pF.

15. The apparatus of claim 1 wherein said modulated current is selected from the group consisting of (i) an amplitude modulated current, (ii) a reverse amplitude modulated current, (iii) a frequency modulated current, and, (iv) a phase modulated current.

16. The apparatus of claim 2 wherein said plurality of measure electrodes further comprises circular electrodes.

17. The apparatus of claim 16 wherein the at least one focusing electrode is at substantially the same potential as the plurality of measure electrodes.

18. The apparatus of claim 1 wherein said apparatus is conveyed on a wireline.

19. An apparatus conveyed in a borehole for obtaining a resistivity parameter of an earth formation penetrated by the borehole, the apparatus comprising:

(a) at least one measure electrode at a first electrical potential capacitively coupled to said formation though a substantially non-conducting fluid in the borehole, said at least one measure electrode connected to a source of electrical current and conveying a measure current into the formation wherein the measure current further comprises a modulated electrical current having a carrier frequency and a modulating frequency substantially less than said carrier frequency.

(b) at least one focusing electrode at a second potential in proximity to said at least one measure electrode for focusing the measure currents into the formation, said second potential having a magnitude greater than a magnitude of the first potential;

(c) at least one pad carrying said at least one measure electrode and said at least one focusing electrode, said at least one pad at a third electrical potential substantially equal to the first potential for maintaining the focusing of the measure currents in the formation.

20. The apparatus of claim 19, wherein the at least one measure electrode further comprises a plurality of measure electrodes and wherein said resistivity parameter further comprises a resistivity image.

21. The apparatus of claim 20 wherein said at least one pad further comprises at least four pads circumferentially disposed on the apparatus.

22. The apparatus of claim 20 further comprising a device responsive to at least one of (i) the current at the at least one measure electrode, and, (ii) a voltage of the at least one measure electrode, for producing a measure signal indicative of said resistivity parameter.

23. The apparatus of claim 22 wherein the measure current further comprises a modulated electrical current having a carrier frequency and a modulating frequency less than said carrier frequency, the apparatus further comprising a demodulator for demodulating said measure signal.

24. The apparatus of claim 19 wherein said plurality of measure electrodes further comprises circular electrodes.

25. The apparatus of claim 20 wherein said apparatus is conveyed on a wireline.

26. The apparatus of claim 20 wherein said apparatus is convey on a drilling tubular selected from (i) coiled tubing, and, (ii) a drillstring.

27. An apparatus conveyed in a borehole for obtaining a resistivity parameter of an earth formation penetrated by the borehole, the apparatus comprising:

(a) at least one measure electrode at a first electrical potential coupled to said formation through a substantially conducting fluid in the borehole, said at least one measure electrode coupled through a capacitor to a source of a modulated electrical current and conveying a measure current into the formation;

(b) at least one focusing electrode at a second potential in proximity to said at least one measure electrode for focusing the measure currents into the formation, said second potential having a magnitude greater than a magnitude of the first potential;

(c) at least one pad carrying said at least one measure electrode and said at least one focusing electrode, said at least one pad at a third electrical potential substantially equal to the first potential for maintaining the focusing of the measure currents in the formation.

28. The apparatus of claim 27 wherein the at least one measure electrode further comprises an array comprising a plurality of measure electrodes and wherein said resistivity information further comprises a resistivity image.

29. The apparatus of claim 27 wherein the modulated measure current further comprises a cater frequency and a modulating frequency substantially less than said carrier frequency.

30. The apparatus of claim 27 further comprising a device responsive to at least one of (i) the current at the at least one measure electrode, and, (ii) a voltage of the at least one measure electrode for producing a measure signal indicative of said resistivity parameter.

31. The apparatus of claim 30 further comprising a demodulator for demodulating said measure signal.

32. The apparatus of claim 28 wherein said plurality of measure electrodes further comprises circular electrodes.

33. The apparatus of claim 27 wherein said apparatus is conveyed en a wireline.

34. A method of obtaining a resistivity parameter of an earth formation penetrated by a borehole, the method comprising:
 (a) conveying a modulated electrical current through at least one measure electrode at a first electrical potential into the formation;
 (b) using at least one focusing electrode in proximity to said at least one measure electrode, and focusing the measure current into the formation, said at least one focusing electrode having a first potential with a magnitude greater than a magnitude of the second potential of the measure electrode;
 (c) maintaining a guard at an electrical potential substantially equal to the potential of the measure electrode and maintaining the focusing of the measure currents in the formation.

35. The method of claim 34 wherein the at least one measure electrode further comprises a plurality of measure electrodes and wherein the resistivity parameter further comprises a resistivity image.

36. The method of claim 34 wherein said fluid in the borehole is substantially non-conducting and conveying said measure current further comprises using a capacitive coupling between the measure electrode and the formation.

37. The method of claim 34 wherein said fluid in the borehole is substantially conducting, and wherein conveying said modulated electrical current further comprises capacitively coupling a source of said electrical current to said measure electrode.

38. The method of claim 34 wherein the modulated electrical current further comprises a carrier frequency and a modulating frequency substantially less than the carrier frequency.

39. The method of claim 38 wherein said carrier frequency is at least 500 kHz. and said modulating frequency is less than 2 kHz.

40. The method of claim 34 wherein focusing the measure current further comprises focusing in a substantially vertical direction.

41. The method of claim 34 further comprising using a device responsive to least one of (i) the current at the at least one measure electrode, and, (ii) a voltage of the at least one measure electrode for producing a measure signal indicative of said resistivity parameter.

42. The method of claim 41 further comprising demodulating said measure signal.

43. The method of claim 42 further comprising electrically isolating a source of said modulated electrical current from the at least one measure electrode.

44. The method of claim 34 further comprising selecting the modulated current from the group consisting of (i) an amplitude modulated current, (ii) a reverse amplitude modulated current, (iii) a frequency modulated current, and, (iv) a phase modulated current.

45. The method of claim 36 further comprising:
 (i) selecting an area of the measure electrode; and
 (ii) selecting a cater frequency of the modulated electrical current to make an impedance of said capacitive coupling at the selected carrier frequency less than an expected impedance of the formation.

46. The method of claim 37 further comprising:
 (i) selecting a capacitance of said capacitor;
 (ii) selecting a carrier frequency of the modulated electrical current and making an impedance of said capacitor at the selected carrier frequency less than an expected impedance of the formation.

47. The method of claim 34 further comprising conveying said apparatus on a drilling tubular selected from (i) coiled tubing, and, (ii) a drillstring, and wherein said at least one pad is substantially non-rotating.

48. The method of claim 34 further comprising conveying said apparatus on a drilling tubular selected from (i) coiled tubing, and, (ii) a drillstring, and wherein said at least one pad is carried on a non-rotating sleeve on a drill collar.

49. A method of obtaining a resistivity parameter of an earth formation penetrated by a borehole, the method comprising:
 (a) coupling a source of modulated electrical current to at least one measure electrode at a first electrical potential and capacitively coupled through a substantially non-conducting fluid in the borehole to the formation, and conveying a measure current into the formation;
 (b) Using at least one focusing electrode in proximity to said at least one measure electrode, and focusing the measure into the formation, said at least one focusing electrode having a potential with a magnitude greater than a magnitude of the potential of the measure electrode; and
 (c) maintaining a guard potential substantially equal to the potential of the measure electrode and maintaining the focusing of the measure current in the formation.

50. The method of claim 49 wherein the at least one measure electrode further comprises a plurality of measure electrodes and wherein said resistivity parameter further comprises a resistivity image.

51. The method of claim 49 wherein the measure current further comprises a modulated electrical current having a carrier frequency and a modulating frequency substantially less than said carrier frequency.

52. The method of claim 49 further comprising using a device responsive to at least one of (i) the current at the at least one measure electrode, and, (ii) a voltage of the at least one measure electrode for producing a measure signal indicative of said resistivity parameter.

53. The method of claim 52 wherein the measure current further comprises a modulated electrical current having a carrier frequency and a modulating frequency less than said carrier frequency, the method further comprising using a demodulator for demodulating said measure signal.

54. The method of claim 50 wherein said plurality of measure electrodes further comprises circular electrodes.

55. The method of claim 49 further comprising conveying said apparatus on a drilling tubular selected from (i) coiled tubing, and, (ii) a drillstring, and wherein said at least one pad is substantially non-rotating.

56. The method of claim 55 wherein said at least electrode is carried on a non-rotating sleeve on a drill collar.

57. A method of obtaining a resistivity parameter of an earth formation penetrated by a borehole having a conductive fluid therein, the method comprising:
   (a) coupling a source of modulated electrical current through a capacitor to at least one measure electrode and conveying a measure current into the formation;
   (b) using at least one focusing electrode in proximity to said at least one measure electrode, and focusing the measure current into the formation, said at least one focusing electrode having a potential with a magnitude greater than a magnitude of the potential of the measure electrode; and
   maintaining a guard potential substantially equal to the potential of the measure electrode and maintaining the focusing of the measure current in the formation.

58. The method of claim 57 wherein the at least one measure electrode further comprises a plurality of measure electrodes and wherein said resistivity parameter further comprises a resistivity image.

59. The method of claim 57 wherein the modulated measure current further comprises a carrier frequency and a modulating frequency substantially less than said carrier frequency.

60. The method of claim 57 further comprising using a device responsive to at least one of (i) the current at the at least one measure electrode, and, (ii) a voltage of the at least one measure electrode for producing a measure signal indicative of said resistivity parameter.

61. The method of claim 60 further comprising using a demodulator for demodulating said measure signal.

62. The method of claim 58 wherein said plurality of measure electrodes further comprises circular electrodes.

63. The method of claim 57 further comprising conveying said apparatus on a drilling tubular selected from (i) coiled tubing, and, (ii) a drillstring, and wherein said at least one pad is substantially non-rotating.

64. The method of claim 63 wherein said at least one electrode is carried on a non-rotating sleeve on a drill collar.

65. An apparatus conveyed in a borehole for obtaining a resistivity parameter of an earth formation penetrated by the borehole, the apparatus comprising:
   (a) at least one measure electrode in electrical contact with a fluid in the borehole, said at least one measure electrode operatively connected to a source of a modulated electrical current having a carrier frequency, said electrode conveying a measure current into the formation; and
   (b) a device responsive to least one of (i) the current in the at least one measure electrode, and, (ii) a voltage of the at least one measure electrode, said device producing a measure signal representative of the resistivity parameter.

66. The apparatus of claim 65 wherein the at least one measure electrode further comprises a plurality of measure electrodes and wherein said resistivity parameter further comprises a resistivity image.

67. The apparatus of claim 65 wherein the at least one measure electrode comprises an array of measure electrodes.

68. The apparatus of claim 65 wherein said fluid in the borehole is substantially non-conducting and the at least one measure electrode is capacitively coupled to the formation.

69. The apparatus of claim 65 wherein said fluid in the borehole is substantially conducting, the apparatus further comprising a capacitor between the at least one measure electrode and the source of electrical current for blocking a component of the measure current at a modulating frequency of the modulated current.

70. The apparatus of claim 65 further comprising a demodulator for demodulating said measure signal and producing a demodulated signal therefrom.

71. The apparatus of claim 69 further comprising an isolator section between the current source and the at least one measure electrode, said isolator section including conductors carrying said modulated current to the measure electrode and said demodulated measure signal from the at least one measure electrode.

72. The apparatus of claim 65 further comprising at least one focusing electrode in proximity to the at least one measure electrode, said at least one focusing electrode focusing the measure currents conveyed into the formation.

73. The apparatus of claim 65 further comprising a guard device for maintaining focusing of said measure current in the formation.

74. The apparatus of claim 65 wherein said apparatus is conveyed into said borehole on one of (i) a wireline, (ii) a drillstring, and, (iii) coiled tubing.

75. A method of obtaining a resistivity parameter of an earth formation penetrated by a borehole containing a fluid, the method comprising:
   (a) using a measure electrode for conveying a measure current into the formation through the fluid, the measure current comprising a modulated electrical current having a carrier frequency;
   (b) determining at least one of (i) the current at the at least one measure electrode, and, (ii) a voltage of the at least one measure electrode for producing a measure signal representative of the resistivity parameter.

76. The method of claim 75 wherein the at least one measure electrode further comprises an array of a plurality of measure electrodes and wherein said resistivity parameter further comprises a resistivity image.

77. The method of claim 75 wherein said fluid in the borehole is substantially non-conducting, the method further comprising capacitively coupling the at least one measure electrode to the formation.

78. The method of claim 75 wherein said fluid in the borehole is substantially conducting, the method further comprising interposing a capacitor between the at least one measure electrode and a source of the modulated electrical current for blocking a component of the measure current at a modulating frequency of the modulated current.

79. The method of claim 75 further comprising using a demodulator for demodulating said measure signal and producing a demodulated signal therefrom.

80. The method of claim 79 further comprising electrically isolating the source of the modulated current from the at least one measure electrode.

81. The method of claim 75 further comprising focusing the measure current conveyed into the formation.

82. The method of claim 75 further comprising using a selected guard potential for further maintaining focusing of said measure current in the formation.

* * * * *